US012122127B2

(12) United States Patent
Clark et al.

(10) Patent No.: US 12,122,127 B2
(45) Date of Patent: Oct. 22, 2024

(54) MICROSPHERE-COATED POLYURETHANE ARTICLES AND METHODS OF MAKING THE SAME

(71) Applicant: 3M INNOVATIVE PROPERTIES COMPANY, St. Paul, MN (US)

(72) Inventors: John C. Clark, Lake Elmo, MN (US); John P. Baetzold, North St. Paul, MN (US); Charlie C. Ho, Woodbury, MN (US); Alexander J. Kugel, Woodbury, MN (US); Yongshang Lu, Woodbury, MN (US); Chris A. Pommer, Woodbury, MN (US); Jay M. Jennen, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 17/605,035

(22) PCT Filed: May 13, 2020

(86) PCT No.: PCT/IB2020/054532
§ 371 (c)(1),
(2) Date: Oct. 20, 2021

(87) PCT Pub. No.: WO2020/234697
PCT Pub. Date: Nov. 26, 2020

(65) Prior Publication Data
US 2022/0219435 A1 Jul. 14, 2022

Related U.S. Application Data

(60) Provisional application No. 62/849,665, filed on May 17, 2019.

(51) Int. Cl.
| | | |
|---|---|---|
| B32B 27/08 | (2006.01) | |
| B32B 27/40 | (2006.01) | |
| B32B 33/00 | (2006.01) | |

(52) U.S. Cl.
CPC ............ *B32B 27/08* (2013.01); *B32B 27/40* (2013.01); *B32B 33/00* (2013.01); *B32B 2264/101* (2013.01); *B32B 2605/00* (2013.01)

(58) Field of Classification Search
CPC ........ G02B 5/128; B05D 5/063; A41D 13/01; A41D 27/085
See application file for complete search history.

(56) References Cited

U.S. PATENT DOCUMENTS

| RE24,906 E | 12/1960 | Ulrich |
|---|---|---|
| 3,331,729 A | 7/1967 | Danielson |

(Continued)

FOREIGN PATENT DOCUMENTS

| CN | 103792604 A | 5/2014 |
|---|---|---|
| CN | 105891924 A | 6/2015 |

(Continued)

OTHER PUBLICATIONS

Satas, "Release Coatings", Handbook of Pressure Sensitive Adhesive Technology, 1989, pp. 585-600.

(Continued)

*Primary Examiner* — Alicia J Weydemeyer
(74) *Attorney, Agent, or Firm* — Julie Lapos-Kuchar

(57) ABSTRACT

Described herein is a multilayered article (10) and methods of making and using such articles. The multilayered article (10) comprises: •(a) a microsphere layer (11) comprising a plurality of microspheres disposed in a monolayer; •(b) a bead bonding layer (12) comprising a first major surface and a second opposing major surface and the plurality of microspheres is partially embedded in the first major surface of the (Continued)

bead bonding layer, and comprises a thermoset polyurethane having a glass transition temperature of at least 35° C.; •(c) a primer layer (14) disposed on the second major surface of the bead bonding layer wherein the primer layer comprises a copolymer of polyurea and polyurethane and wherein the primer layer is covalently attached to the bead bonding layer via urea linkages; and •(d) an elastomeric layer (16) disposed on the primer layer opposite the bead bonding layer, wherein the elastomeric layer comprises a polyurethane thermoplastic elastomer.

19 Claims, 3 Drawing Sheets

(56) References Cited

U.S. PATENT DOCUMENTS

| | | | |
|---|---|---|---|
| 3,700,305 | A | 10/1972 | Bingham |
| 4,418,120 | A | 11/1983 | Kealy |
| 4,619,867 | A | 10/1986 | Charbonneau |
| 4,725,494 | A * | 2/1988 | Belisle .................. G02B 5/128 |
| | | | 428/327 |
| 4,835,217 | A | 5/1989 | Jorgensen |
| 4,849,265 | A | 7/1989 | Ueda |
| 5,620,775 | A | 4/1997 | LaPerre |
| 8,551,285 | B2 | 10/2013 | Ho |
| 9,217,816 | B2 | 12/2015 | Zhang et al. |
| 10,245,812 | B2 | 4/2019 | Walker, Jr. |
| 10,545,268 | B2 | 1/2020 | Xia et al. |
| 10,844,160 | B2 | 11/2020 | Walker, Jr. et al. |
| 2009/0246439 | A1 | 10/2009 | Kanno |
| 2011/0292508 | A1 * | 12/2011 | Huang ..................... B44F 1/02 |
| | | | 359/542 |
| 2013/0286495 | A1 * | 10/2013 | Wang .................. G02B 5/0284 |
| | | | 359/883 |
| 2015/0010723 | A1 | 1/2015 | Krishnan |
| 2015/0343502 | A1 | 12/2015 | Clark |
| 2016/0145458 | A1 | 5/2016 | Walker, Jr. |
| 2017/0174854 | A1 | 6/2017 | Clark |
| 2018/0223142 | A1 | 8/2018 | Walker, Jr. |
| 2018/0273812 | A1 | 9/2018 | Abe et al. |
| 2019/0060284 | A1 | 2/2019 | Bosmans |

FOREIGN PATENT DOCUMENTS

| | | | |
|---|---|---|---|
| CN | 104853931 A | 8/2015 | |
| CN | 108139515 A | 6/2016 | |
| CN | 106574993 A | 4/2017 | |
| CN | 108368386 A | 8/2018 | |
| EP | 0102818 | 3/1984 | |
| EP | 2 581 216 A1 | 4/2013 | |
| WO | WO 1987-000189 | 1/1987 | |
| WO | WO-9718947 A1 * | 5/1997 | ............. B32B 27/08 |
| WO | WO-0221167 A1 * | 3/2002 | ....... B32B 17/10018 |
| WO | WO 2003-037648 | 5/2003 | |
| WO | 2014/055828 A1 | 4/2014 | |
| WO | WO-2017007615 A1 * | 1/2017 | ................ C08J 5/18 |
| WO | WO 2017-106239 | 6/2017 | |
| WO | WO 2017-172888 | 10/2017 | |
| WO | WO-2017172888 A1 * | 10/2017 | ............. B32B 27/14 |
| WO | WO 2018-031355 | 2/2018 | |
| WO | WO 2019-046407 | 3/2019 | |
| WO | WO 2019-060284 | 3/2019 | |

OTHER PUBLICATIONS

International Search Report for PCT International Application No. PCT/IB2020/054532, mailed on Aug. 10, 2020, 5 pages.

* cited by examiner

MICROSPHERE-COATED POLYURETHANE ARTICLES AND METHODS OF MAKING THE SAME

TECHNICAL FIELD

A multilayered article comprising a monolayer of microspheres embedded in a polyurethane layer is discussed along with methods of making such articles. The articles of the present disclosure can be useful, for example, in applications, which require mechanical durability and weatherability, such as in paint protection or paint replacement applications for automotive, watercraft, and aerospace industries.

BACKGROUND

Durable laminates and films comprised of glass beads are broadly known. These low gloss constructions typically consist of exposed glass bead surfaces that impart high durability and decorative properties to the construction. Typically, the beads are cascade coated or otherwise applied, such that the beads are randomly positioned in a closely packed monolayer, forming a continuous monolayer across the article surface. See U.S. Pat. No. 4,849,265 (Ueda et al.) and U.S. Pat. No. 5,620,775 (LaPerre).

DESCRIPTION OF THE FIGURES

Embodiments of the present disclosure are illustrated by way of example, and not limitation, in the accompanying drawings in which.

SUMMARY

Figure 1:
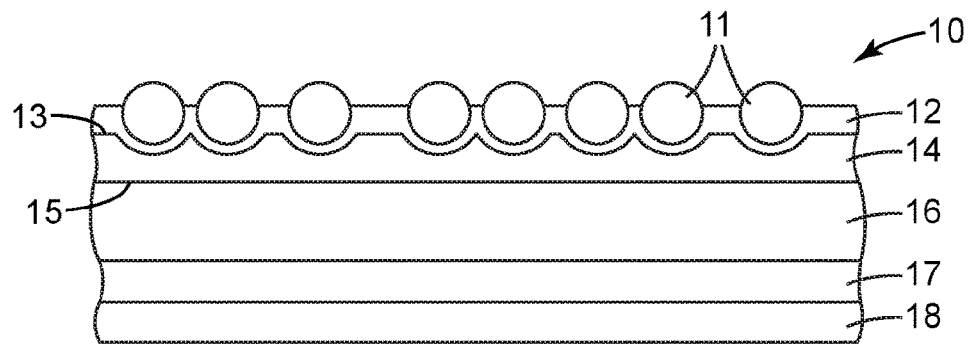
FIG. 1 is a schematic cross-sectional view of a microsphere-coated polyurethane article according to one embodiment of the present disclosure.

There is a desire to identify microsphere coated articles having good durability (such as abrasion resistance, and chip resistance) as well as weatherability. Such articles can find application as surface coverings in the paint protection or paint replacement applications for automotive, watercraft, and aerospace industries.

In one aspect, an article is provided. The article (also referred to herein as a multilayered article) comprising:
(a) a microsphere layer comprising a plurality of microspheres disposed in a monolayer;
(b) a bead bonding layer comprising a first major surface and a second opposing major surface and the plurality of microspheres is partially embedded in the first major surface of the bead bonding layer, and the bead bonding layer comprises a thermoset polyurethane having a glass transition temperature of at least 35° C.;
(c) a primer layer disposed on the second major surface of the bead bonding layer wherein the primer layer comprises a copolymer of polyurea and polyurethane and wherein the primer layer is covalently attached to the bead bonding layer via urea linkages; and
(d) an elastomeric layer disposed on the primer layer opposite the bead bonding layer, wherein the elastomeric layer comprises a polyurethane thermoplastic elastomer.

In another aspect, a method of making a bead coated film is provided. The method comprising:
providing a transfer sheet comprising a transfer polymer layer having a monolayer of microspheres partially embedded thereon;
coating the embedded monolayer of microspheres with a bead bonding reaction mixture; partially curing the bead bonding reaction mixture to form a bead bonding layer, wherein the bead bonding layer comprises a thermoset polyurethane and has a glass transition temperature of at least 35° C.;
contacting a primer reaction mixture onto the bead bonding layer;
curing the second reaction mixture to form a primer layer, wherein the primer layer comprises a copolymer of polyurea and polyurethane and wherein the primer layer is covalently attached to the bead bonding layer via urea linkages;
disposing a polyurethane thermoplastic elastomer onto the primer layer; and
removing the transfer sheet to form the bead coated film.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B);
"ambient conditions" means at a temperature of 25 degrees Celsius and a pressure of 1 atmosphere (approximately 100 kilopascals);
"ambient temperature" means at a temperature of 25 degrees Celsius;
"catalyst" means a substance that can increase the speed of a chemical reaction;
"diol" means a compound having a hydroxyl functionality of exactly two;
"diisocyanate" means a compound having an isocyanate functionality of exactly two;
"cure" means to alter the physical state and or chemical state of the composition to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;
"curable" means capable of being cured;
"essentially free of" means having only trace amounts of a given substance, for example having less than 0.5%, 0.4, 0.3, 0.2, 0.1, 0.05, 0.02, 0.01, 0.005, or 0.001% by weight of that substance;
"fully cured" means cured to a state where the composition is suitable for use in its intended application;
"partially cured" means cured to a state that is less than fully cured; "polyisocyanate" means a compound having an isocyanate functionality of two or more; and
"polyol" means a compound having a hydroxyl functionality of two or more.

The term "substituted" as used herein in conjunction with a molecule in which one or more hydrogen atoms contained therein are replaced by one or more non-hydrogen atoms. Examples of substituents or functional groups that can be substituted include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

Also herein, recitation of ranges by endpoints includes all numbers subsumed within that range (e.g., 1 to 10 includes 1.4, 1.9, 2.33, 5.75, 9.98, etc.).

Also herein, recitation of "at least" followed by a number, includes the specific number and all numbers greater that that specific number. For example, "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

The present disclosure has identified a particular microsphere-coated multilayered article, which has, among other things, good mechanical durability (e.g., abrasion resistance, chip resistance, and/or pencil hardness), and weather durability (such as heat, and/or UV-resistance). These constructions can be applied to surfaces to alter the properties of the surface.

FIG. 1 is an illustration of a cross-section of one embodiment of a multilayered article of the present disclosure. Multilayered article 10 comprises a microsphere layer which comprises a monolayer of microspheres 11. Bead bonding layer 12 comprises a first major and second major surface 13, which is opposite the first major surface. The plurality of microspheres is embedded in the first major surface of the bead bonding layer, and the second major surface 13 is in contact with primer layer 14. Primer layer 14 is disposed on elastomeric layer 16. In one embodiment, as shown in FIG. 1, the construction further comprises adhesive layer 17 and optionally, liner 18.

Elastomeric Layer

The elastomer layer is a thermoplastic elastomer layer comprising polyurethane. This layer should have elastomeric properties, enabling the layer to absorb impacts from small objects, such as rocks, while also allowing flexibility of the multilayered article.

In one embodiment, the polyurethane has an elongation at break of at least 50, 100, 200, 400, 600, 800 or even 1000% when tested, for example, by ASTM D-882-18 will a pull rate of 12 in/min (30 cm/min) with a jaw gap of 1 in (30 cm) using, for example, an Instron model 5565 (Norwood, MA).

In one embodiment, the elastomer layer has a glass transition temperature of less than 30, 25, 20, 15, 10, 5, 0, −5, −10, −15, or even −20° C. The glass transition temperature may be determined using techniques known in the art, for example, using dynamic mechanical analyzer such as DMA Q800 from TA Instruments, New Castle, DE with a ramp rate of 10° C./min at 1 Hz.

The polyurethane in the elastomeric layer can have a weight-average molecular weight in a range of from at least about 80,000; 85,000; 90,000; 100,000; 150,000; or even 175,000 daltons; and at most 200,000; 300,000; or even 400,000 daltons.

The thickness of elastomeric layer can be from at least 25, 30, 40, 50, 60, 70, or even 100 micrometers. In one embodiment, the thickness of the elastomeric layer is at most 75, 100, 150, 200, 250, 300, 400, or even 500 micrometers.

In one embodiment, the polyurethane of the elastomeric layer is a reaction product of a reaction mixture that includes a diisocyanate, a polymeric diol, and a chain extender.

The diisocyanate refers to a molecule having two isocyanate (—N═C═O) functional groups. An example of a suitable diisocyanate includes a diisocyanate according to Formula I:

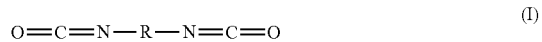

$$O=C=N-R-N=C=O \quad (I)$$

wherein R is a $C_1$-$C_{40}$)alkylene, ($C_2$-$C_{40}$)alkenylene, ($C_4$-$C_{20}$)arylene, ($C_4$-$C_{20}$)arylene-($C_1$-$C_{40}$)alkylene-($C_4$-$C_{20}$)arylene, ($C_4$-$C_{20}$)cycloalkylene, or ($C_4$-$C_{20}$)aralkylene, which may be substituted or unsubstituted. Exemplary diisocyanates include: dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, toluene 2,4-diisocyanate, tolylene-2,6-diisocyanate, poly(hexamethylene diisocyanate), 1,4-cyclohexylene diisocyanate, 4-chloro-6-methyl-1,3-phenylene diisocyanate, hexamethylene diisocyanate, toluylene diisocyanate, diphenylmethane 4,4'-diisocyanate, 1,4-diisocyanatobutane, 1,8-diisocyanatooctane, 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate, methylenediphenylene-4,4'-diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, tetramethyl-m-xylylene diisocyanate, 1,6-diisocyanatohexane 1,12-diisocyanatododecane, 2-methyl-1,5-diisocyanatopentane, methylenedicyclohexylene-4,4'-diisocyanate, 3-isocyanatomethyl-3,5,5-trimethylcyclohexyl isocyanate, 2,2,4-trimethylhexyl diisocyanate, or a mixture thereof.

The amount of diisocyanate used to form the elastomeric layer can range from at least 0.5, 1, 1.5, 2, 3, 5, 8, or even 10 wt (weight) %; and at most 15, 20, 25, 30, 35, 40, 45, or even 47 wt % of the reaction mixture. The amount of the diisocyanate in the reaction mixture of the elastomeric layer can be expressed in terms of an isocyanate index. An isocyanate index can be generally understood to refer to the ratio of the equivalent amount of isocyanate functional groups used relative to the theoretical equivalent amount of hydroxyl functional groups. The theoretical equivalent amount is equal to one equivalent isocyanate functional group per one equivalent hydroxyl group; this is an index of 1.00. In one embodiment, the isocyanate index of the reaction mixture used to form the elastomeric layer is at least 0.99, 1.00, 1.02, 1.03, 1.04, or even 1.05; and at most 1.10, 1.12, 1.14, 1.16, 1.18, or even 1.20.

The term polymeric diol used herein includes both polymers and small molecules having two hydroxyl (—OH) groups. Diols can be selected from the group consisting of: caprolactone diols, polycarbonate diols, polyester diols, acrylic diols, polyether diols, polyolefin diols, and mixtures thereof.

The amount of polymeric diol used to form the elastomeric layer can range from at least 43, 45, or even 50 wt %; and at most 55, 60, 65, or even 70 wt % of the reaction mixture.

In one embodiment, the polymeric diol is a polyester diol. In one embodiment, the polyester diol can be a reaction product of a condensation reaction such as a polycondensation reaction. However, the polyester polyol is not made via a ring opening polymerization reaction.

In examples where the polyester diol is made according to a condensation reaction, the reaction can be between one or more carboxylic acids and one or more polymeric diols. An example of a suitable carboxylic acid includes a carboxylic acid according to Formula II, having the structure:

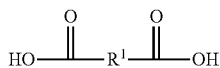
(II)

Wherein $R^1$ is a $(C_1-C_{40})$alkylene, $(C_2-C_{40})$alkylene, $(C_2-C_{40})$alkenylene, $(C_4-C_{20})$arylene, $(C_4-C_{20})$cycloalkylene, or $(C_4-C_{20})$ aralkylene, which may be substituted or unsubstituted. Specific examples of suitable carboxylic acids include glycolic acid (2-hydroxyethanoic acid), lactic acid (2-hydroxypropanoic acid), succinic acid (butanedioic acid), 3-hydoxybutanoic acid, 3-hydroxypentanoic acid, terepthalic acid (benzene-1,4-dicarboxylic acid), naphthalene dicarboxylic acid, 4-hydroxybenzoic acid, 6-hydroxynaphtalane-2-carboxylic acid, oxalic acid, malonic acid (propanedioic acid), adipic acid (hexanedioic acid), pimelic acid (heptanedioic acid), ethanoic acid, suberic acid (octanedioic acid), azelaic acid (nonanedioic acid), sebacic acid (decanedioic acid), glutaric acid (pentanedioic acid), dedecandioic acid, brassylic acid, thapsic acid, maleic acid ((2Z)-but-2-enedioic acid), fumaric acid ((2E)-but-2-enedioic acid), glutaconic acid (pent-2-enedioic acid), 2-decenedioic acid, traumatic acid ((2E)-dodec-2-enedioic acid), muconic acid ((2E,4E)-hexa-2,4-dienedioic acid), glutinic acid, citraconic acid((2Z)-2-methylbut-2-enedioic acid), mesaconic acid ((2E)-2-methyl-2-butenedioic acid), itaconic acid (2-methylidenebutanedioic acid), malic acid (2-hydroxybutanedioic acid), aspartic acid (2-aminobutanedioic acid), glutamic acid (2-aminopentanedioic acid), tartonic acid, tartaric acid (2,3-dihydroxybutanedioic acid), diaminopimelic acid ((2R,6S)-2,6-diaminoheptanedioic acid), saccharic acid ((2S,3S,4S,5R)-2,3,4,5-tetrahydroxyhexanedioic acid), mexooxalic acid, oxaloacetic acid (oxobutanedioic acid), acetonedicarboxylic acid (3-oxopentanedioic acid), arbinaric acid, phthalic acid (benzene-1,2-dicarboxylic acid), isophtalic acid, diphenic acid, 2,6-naphtalenedicarboxylic acid, or a mixture thereof.

An example of a suitable diol includes a diol according to Formula III, having the structure:

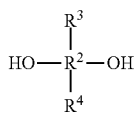
(III)

wherein $R^2$ is a $(C_1-C_{40})$alkylene, $(C_2-C_{40})$alkenylene, $(C_4-C_{20})$arylene, $(C_1-C_{40})$acylene, $(C_4-C_{20})$cycloalkylene, $(C_4-C_{20})$aralkylene, or $(C_1-C_{40})$alkoxyene, which may be substituted or unsubstituted; and $R^3$ and $R^4$ are independently chosen from —H, —OH, $(C_1-C_{40})$alkyl, $(C_2-C_{40})$alkenyl, $(C_4-C_{20})$aryl, $(C_1-C_{20})$acyl, $(C_4-C_{20})$cycloalkyl, $(C_4-C_{20})$aralkyl, and $(C_1-C_{40})$alkoxy, which may be substituted or unsubstituted.

An example of another suitable polyol includes a compound according to Formula IV, having the structure:

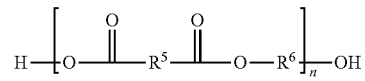
(IV)

wherein $R^5$ and $R^6$ are independently chosen from $(C_1-C_{40})$alkylene, $(C_2-C_{40})$alkenylene, $(C_4-C_{20})$arylene, $(C_1-C_{40})$acylene, $(C_4-C_{20})$cycloalkylene, $(C_4-C_{20})$aralkylene, or $(C_1-C_{40})$alkoxyene, which may be substituted or unsubstituted; and n is a positive integer greater than or equal to 1 (for example, greater than 2, 4, 5, or even 10).

An example of another suitable polyol includes a compound according to Formula V, having the structure:

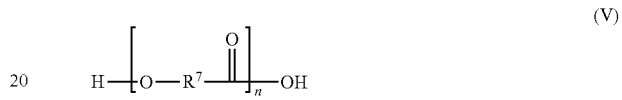
(V)

Wherein $R^7$ is a $(C_1-C_{40})$alkylene, $(C_2-C_{40})$alkenylene, $(C_4-C_{20})$arylene, $(C_1-C_{40})$acylene, $(C_4-C_{20})$cycloalkylene, $(C_4-C_{20})$aralkylene, or $(C_1-C_{40})$alkoxyene, which may be substituted or unsubstituted; and n is a positive integer greater than or equal to 1 (for example, greater than 2, 4, 5, or even 10). In specific examples, the polyester polyol includes one or more of polyglycolic acid (poly[oxy(1-oxo-1,2-ethanediyl]), polybutylene succinate (poly(tetramethylene succinate)), poly(3-hydroxybutyrate-co-3-hydroxyvalerate), polyethylene terephthalate (poly(ethyl benzene-1,4-dicarboxylate)), polybutylene terephthalate (poly(oxy-1,4-butanediyloxycarbonyl-1,4-phenylenecarbonyl)), polytrimethylene terephthalate (poly(trimethylene terephthalate); poly (oxy-1,3-propanediyloxycarbonyl-1,4-phenylenecarbonyl)), polyethylene naphthalate (poly(ethylene 2,6-naphthalate)), poly(1,4-butylene adipate), poly(1,6-hexamethylene adipate), poly(ethylene-adipate), mixtures thereof, and copolymers thereof. However, the polyester polyol is free of polycaprolactone polyol ((1,7)-polyoxepan-2-one).

An appropriate melting temperature can help to increase the degree of crystallinity of the elastomeric layer. The degree of crystallinity can be determined through differential scanning calorimetry and is expressed as the fractional amount of crystallinity in the polyurethane thermoplastic elastomer. The degree of crystallinity can be in a range of from at least 30, 40, or even 50% to at most 55, 60, 65, or even 70%. The degree of crystallinity can make it easier to roll the elastomeric layer as it takes a relatively high temperature to begin to liquefy the elastomeric layer.

A chain extender can be added to the reaction mixture used to form the elastomeric layer to increase the molecular weight of the resulting polyurethane and strengthen the elastomeric layer. The chain extender can be in a range of from at least 1, 1.5, 2, 2.5, 3, 4, or even 5 wt %; and at most 6, 7, 8, 10, 11, or even 13 wt % of the reaction mixture.

In one embodiment, the chain extender is a diol chain extender having two hydroxyl groups. The diol chain extender has weight-average molecular weight of at least 30, 40, 50, 60 or even 80 daltons; and at most 100, 125, 150, 175, 200, 225, or even 250 daltons. The diol chain extender can include any suitable number of carbons. For example, the diol chain extender can include a number-average number of about 2 carbons to about 20 carbons, about 3 carbons to about 10 carbons, or less than, equal to, or greater than about 2 carbons, 3, 4, 5, 6, 7, 8, 9, 10, 11, 12, 13, 14, 15, 16, 17, 18, 19, or 20 carbons. Diol chain extenders comprising relatively short chains can be stiffer than a longer chain diol, resulting in strengthen the elastomeric layer. The short chain diols can be stiffer, for example, because the short chain diol is more restricted in terms of rotation about the individual bonds along the chain. Examples of suitable diol chain extenders include ethylene glycol, diethylene glycol, triethylene glycol, tetraethylene glycol, propylene glycol, dipropylene glycol, tripropylne glycol, 1,3-propanediol, 1,3-butanediol, 1,4-butanediol, neopentyl glycol, 1,6-hexanediol, 1,4-cyclohexanedimethanol, or a mixture thereof.

In one embodiment, the polyurethane thermoplastic elastomer includes a hard segment. A hard segment generally refers to harder, less flexible polymer segment, which results from polymerization of the diisocyanate and the diol chain extender. The amount of the hard segment can be determined by calculating the total amount (wt %) of isocyanate, chain extender, and cross-linker. That total amount is then divided by the total weight of the polyurethane thermoplastic elastomer. The hard segment can be in a range of from at least 30, 32, 34, 36, 38, or even 40 wt % to at most 45, 48, 50, 53, or even 55 wt % of the polyurethane thermoplastic elastomer. Hard segments are present as domains, which can interact with each other to effectively form a crosslink therebetween (e.g., through a hydrogen bond). Under stress for example, through a mechanical deformation, the hard segments can become aligned in the stress direction. This alignment coupled with the hydrogen bonding can contribute to the stiffness, elastomeric resilience, or tear resistance of the elastomeric layer.

In some examples, the reaction mixture used to form the elastomeric layer can include a crosslinker. Examples of crosslinkers include polyhydroxy group compounds and polyisocyanate compound. For example, the polyhydroxy compounds can include 3 hydroxy groups or 4 hydroxy groups. The polyisocyanate can include 3 cyano groups or 4 cyano groups. While there are many suitable crosslinkers, the reaction mixture is free of an aziridine crosslinker. If present, the crosslinkers can function to crosslink the polyurethane chains of the elastomeric layer.

The thickness of the elastomeric layer is not particularly restricted. Preferably, the elastomeric layer is sufficiently thin to allow the overall multilayered article to stretch as needed to conform to a substrate having three-dimensional contours that are curved or irregularly shaped, and yet sufficiently thick to protect the substrate against scratches and impacts encountered in use.

The thickness of the elastomeric layer can be at least 50, 60, 70, 80, 100, or even 150 micrometers; and at most 200, 250, 300, 250, 300, 350, 400, 450, 500, 550, or even 600 micrometers.

Bead Bonding Layer

The plurality of microspheres in the multilayered article are held in place via a bead bonding layer. The bead bonding layer is a thermoset polyurethane (wherein a thermoset is a polymer which does not have a bulk softening temperature and cannot be melted or shaped after polymerization). In one embodiment, the thermoset polyurethane has a glass transition temperature of at least 35, 40, 45, 50, 60, 70, or even 80° C. In one embodiment, the thermoset polyurethane has a glass transition temperature of at most 90, 95, 100, 110, or even 120° C. The glass transition temperature may be determined using techniques known in the art, for example, using dynamic mechanical analyzer such as DMA Q800 from TA Instruments, New Castle, DE with a ramp rate of 10° C./min at 1 Hz. The thermoset polyurethane should exhibit good adhesion to the microspheres. In one embodiment, an adhesion promoter is added to the bead bonding reaction mixture to improve adhesion between the microspheres and the bead bonding layer. The adhesion promoter should be compatible within the process window for disposing the bead bonding layer on the surfaces of the microspheres.

In one embodiment, the bead bonding layer is obtained by curing a polyurethane composition. In some embodiments, the polyurethane composition is a curable composition whose components react with each other to provide a cured, hardened layer. The curable composition used to obtain the bead bonding layer can include a polyisocyanate, and a polyol.

Suitable polyisocyanates include diisocyanates and polyisocyanates with an isocyanate functionality of greater than 2 (for example, greater than 3, 4, 6, or even more). In exemplary embodiments, the polyisocyanate is a primary polyisocyanate, such as a primary aliphatic polyisocyanate. Primary polyisocyanates having an isocyanate functionality of 3 or more can be made from primary diisocyanates, such as 1,6-hexamethylene diisocyanate, trimethyl-hexamethylene diisocyanate, 1,4-tetramethylene diisoycanate, 1,3-xylene diisocyanate, 1,4-xylene diisocyanate, 1,12-dodecamethylene diisocyanate, 2-methylpentamethylene diisocyanate, or 1,4-cyclohexane dimethylene diisocyanate.

In the reaction mixture used to form the bead bonding layer, the polyisocyanate can represent from at least 30, 35, 40, 45, or even 50 wt % to at most 60, 70, 75, 80, 85, or even 90 wt %, relative to the overall weight of the reaction mixture.

Suitable polyols include diols and polyols with a hydroxyl functionality of greater than two. Polyols can be selected from the group consisting of: polycaprolactone polyols, polycarbonate polyols, polyester polyols, acrylic polyols, polyether polyol, polyolefin polyol, and mixtures thereof.

Collectively, the polyol components used in making the bead bonding layer can account for at least 25, 30, or even 35 wt % to at most 60, 65, 70, 75, or even 80 wt % relative to the overall weight of the reaction mixture used to form the bead bonding layer.

In one embodiment, the reaction mixture used to form the bead bonding layer comprises a hydroxy-functional silicone poly(meth)acrylate. The hydroxy-functional silicone poly (meth)acrylate is a copolymer comprised of siloxane side groups, such as polydimethylsiloxane side groups, covalently bonded to an acrylic or methacrylic backbone. The copolymer may have exactly one hydroxyl group, in which case it is a monohydroxyl silicone poly(meth)acrylate. Alternatively, the hydroxy-functional silicone poly(meth)acrylate can have more than one hydroxyl group, in which case it is a silicone poly(meth)acrylate polyol. The backbone of the hydroxy-functional silicone poly(meth)acrylate can contain any of a variety of repeat units, including for example hydroxyethyl methacrylate, 2-ethylhexyl acrylate, 2-ethylhexanol, styrene, and combinations thereof. In one embodiment, the primer layer is essentially of hydroxy-functional silicone poly(meth)acrylate, containing less than 0.5, 0.2, 0.1, 0.05, 0.01, 0.005, or 0.001% by weight of the hydroxy-functional silicone poly(meth)acrylate.

Addition of the hydroxy-functional silicone poly(meth) acrylate can improve stain resistance of the bead bonding layer when fully cured. The hydroxy-functional silicone poly(meth)acrylate can be from at least 0.1, 0.2, 0.5, 0.8, or even 1 wt % to at most 1.5, 2, 2.5, 3, 3.5, or even 4 wt % based on the overall weight of the reaction mixture used to form the bead bonding layer.

The curable composition used to form the bead bonding layer can further include a catalyst to facilitate reaction between the polyisocyanate and polyol components. Useful catalysts in the polymerization of polyurethanes include aluminum-, bismuth-, tin-, vanadium-, zinc-, mercury-, and zirconium-based catalysts, amine catalysts, and mixtures thereof. Preferred catalysts include tin based catalysts, such as dibutyl tin compounds. Especially preferred are catalysts selected from the group consisting of dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide.

Suitable amounts of the catalyst can be from at least 0.001, 0.005, 0.01, 0.02, 0.05, or even 0.08 wt % to at most 0.1, 0.12, 0.15, 0.17, or even 0.2 wt % based on the overall weight of the reaction mixture used to form the bead bonding layer.

The multilayered constructions of the present disclosure should have weathering durability. Thus, ultraviolet radiation absorbers and/or hindered amines (HALS) can be added to the various layers, especially the bead bonding layer to minimize ultraviolet radiation damage to the article and/or the surface it protects, helping to minimize defects caused by cracking and gloss reduction in these layers. Exemplary UV-absorbers include: benzotriazole compound, 5-trifluoromethyl-2-(2-hydroxy-3-alpha-cumyl-5-tert-octylphenyl)-2H-benzotriazole, or combinations thereof. Other exemplary benzotriazoles include: 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole, or combinations thereof. Additional exemplary UV-absorbers include 2(-4,6-diphenyl-1-3,5-triazin-2-yl)-5-hexcyloxy-phenol, and those available from BASF, Florham Park, NJ sold under the trade designations "TINUVIN 1577", "TINUVIN 405", and "TINUVIN 900". In addition, UV-absorber(s) can be used in combination with stabilizers such as hindered amine light stabilizer(s) (HALS) and/or anti-oxidants. Stabilizers can eliminate free radicals produced by photo-oxidation of the polymer. Exemplary HALSs include those available from BASF sold under the trade designations "CHIMASSORB 944", TINUVIN-292, and "TINUVIN 123". Typically, the UV-absorber and/or hindered amine light stabilizers are present in a total amount of at least 1, 1.5, 1.75, or even 2 wt % and at most 2.5, 3, 3.5, 4, 4.5, or even 5 wt % in the reaction mixture and/or the cured layer (such as the bead bonding layer, primer layer or elastomeric layer).

If desired, other components can also be included in the reaction mixture to form the bead bonding layer, such as leveling agents, colorants, flame retardants, and pot life extenders.

The bead bonding layer of the present disclosure is derived from a solvent-based solution. In other words, a solvent (such as an organic solvent or water) is used to dissolve the reaction components to make the bead bonding layer, but the solvent does not polymerize or cure when forming the bead bonding layer. An organic solvent can be used to adjust the viscosities of the reactive mixture used to make the bead bonding layer. Such organic solvents can include ether acetate, propylene glycol monomethylether acetate, ketone, benzene derivatives, and mixtures thereof. In one embodiment, the reaction mixture for the bead bonding layer is substantially free of water (for example, comprising less than 1, 0.5, 0.1, or even 0.05 wt % in the reaction mixture). The amount of solvent can be selected to facilitate adequate mixing and casting of the curable polyurethane composition. The organic solvent used is generally volatile so that it can be removed prior to, or concurrently with, the curing of the bead bonding layer. Such evaporation could be facilitated by heat, vacuum, or both.

When the foregoing reactive components of the bead bonding layer are mixed and sufficiently heated, they polymerize into a crosslinked network. The crosslink density of a polyurethane in the bead bonding layer is calculated by dividing the weight of the reaction components having a functionality of 3 or greater by the total weight of the polyurethane and multiplying by 100. High crosslink densities, for example exceeding 30 percent, are generally associated with rigid polyurethane materials. Use of a primary aliphatic polyisocyanate, however, can enable polyurethanes that are both flexible and have a high crosslink density. Useful crosslink densities can be from at least 25, 30, 35, 40, or even 45% to at most 50, 55, 60, 70, 80, 90, or even 100%.

In one embodiment, the bulk bead bonding layer is substantially free of polyurea. In other words, outside of the interfaces with adjacent layers, the bulk of the bead bonding layer comprises less than 3, 2, 1, 0.5, 0.1% by wt or even no urea bonds.

Because of the high crosslinking density in the bead bonding layer, the bead bonding layer is thin. Typically, the thickness of the cured bead bonding layer is less than the distance the microspheres are embedded into the bead bonding layer. For example, the thickness of the bead bonding layer is less than 50, 45, 40, 35, or even 30% of the average diameter of the microspheres. As depicted in FIG. 1 (not drawn to scale), the bead bonding layer, spans between microspheres forming part of the outermost surface of the multilayered article as well as coating the undersides of the microspheres.

Primer Layer

A second polyurethane layer is provided, which is disposed between the bead bonding layer and the elastomeric layer. The purpose of this layer is to improve the adhesion of the bead bonding layer to the elastomeric layer.

The primer layer extends along and contacts second major surface 13 of the bead bonding layer. The primer layer is made by curing a second polyurethane composition. Use of the primer layer can be advantageous because the primer layer results in covalent bonding (via urea linkages) and optionally secondary bonding (such as hydrogen bonding) at the interface between the bead bonding layer and the primer layer enabling increased interlayer adhesion.

The primer layer composition can have characteristics similar to that of the bead bonding composition as described above. In one embodiment, the primer layer differs from the bead bonding composition in that it is comprises not only polyurethane groups (—NH—C(=O)—O—), but also polyurea groups (—NH—C(=O)—NH—). The reaction mixture forming the primer layer comprises amine groups, or has the capability of forming amine groups, which can react with the isocyanate groups of the bead bonding layer and/or the elastomeric layer, leading to covalent (urea) bonding (and possibly hydrogen bonding) between the primer layer and its adjacent layers (in other words second major surface 13 of the bead bonding layer and major surface 15 of the primer layer), resulting in increased interlayer adhesion.

In some embodiments, the primer layer composition is a water-borne polyurethane dispersion. Preferred water-borne polyurethane dispersions include aliphatic polycarbonate polyurethane dispersions. The dispersion can use a solvent system that includes water and one or more co-solvents. Certain co-solvents, such as diethylene glycol monomethyl ether, can be helpful to improve coating quality by reducing volatility of the dispersion.

The polyurethane dispersion used for the primer layer can include any of a number of suitable surfactants, such as anionic surfactants. Anionic surfactants include, for example, sulfates such as sodium dodecyl sulfate, ammonium dodecyl sulfate, and sodium lauryl ether sulfate, and sulfosuccinnates such as dioctyl sodium sulfosuccinate and disodium lauryl sulfosuccinate. In water-borne coatings, these surfactants can be used in combination with co-dispersants. Co-dispersants include amino alcohols. Amino alcohols, such as 2-amino-2-methyl-1-propanol, can assist in neutralizing acid-functional resins, making them suitable for use in water-borne coatings.

The primer composition can include any suitable crosslinker, such as a polyfunctional aziridine liquid crosslinker. The amount of crosslinker is not critical and can be selected to provide the desired degree of crosslinking. The amount of crosslinker can be from at least 0.5, 0.7, 1, 1.2, or even 1.5 wt % to at most 2, 2.5, 3, 3.5, 4.5, or even 5 wt % relative to the overall weight of the reaction mixture used to form the primer layer.

When the foregoing reactive components of the primer layer are mixed and sufficiently heated, they polymerize into a crosslinked network. In one embodiment, the crosslink density of the primer layer is the same or lower than the crosslink density of the bead bonding layer. Useful crosslink densities can be from at least 25, 30, 35, 40, or even 45% to at most 50, 55, 60, 70, 80, 90, or even 100%.

As mentioned above, other additives such as UV light absorbers and stabilizers can also be included in the primer layer.

In a preferred embodiment, the primer layer is formed from a water-borne polyurethane dispersion which is a polycarbonate polyurethane having a solids content of from 30-40 wt % and an overall solvent content of from 5-15 wt %.

The primer layer has a chemical composition capable of permanently adhering to the bead bonding layer. Preferably, the bead bonding layer and the primer layer do not delaminate from each other during the lifetime of the multilayered article, even under harsh environments.

The thickness of the primer layer need not be particularly restricted. In some embodiments, this thickness can be similar to that of the bead bonding layer. The film thickness of the primer layer when cured can be at least 12, 15, 20, 25, 30, 35, or even 40 micrometers; and at most 50, 60, 75, or even 85 micrometers. The primer layer is a continuous or discontinuous layer across the multilayered article and typically, comprises a less undulating or more planar surface (as compared to its opposing surface contacting the bead bonding layer), upon which the elastomer layer is disposed.

The bead bonding layer, primer layer, and/or the elastomeric layer may be transparent, translucent, or opaque. The bead bonding layer, primer layer, and/or the elastomeric layer may be colored or colorless. The bead bonding layer may, for example, be clear and colorless or pigmented with opaque, transparent, or translucent dyes and/or pigments. In some embodiments, inclusion of specialty pigments, such as for example metallic flake pigments, can be useful.

Microsphere Layer

The microsphere layer comprises a plurality of microspheres. The plurality of microspheres are arranged in a monolayer (or single layer) across the bead bonding layer. The microspheres useful in the present disclosure comprise glass, glass ceramics, ceramics, polymers, metals, and combinations thereof. Glass is an amorphous material, while ceramic refers to a crystalline or partially crystalline material. Glass ceramics have an amorphous phase and one or more crystalline phases. These materials are known in the art.

In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Missouri, and glass available under the trade designation "PYREX" from Corning Incorporated, New York, New York.

The grinding process yields a wide distribution of glass particle sizes. The glass particles are spherodized by treating in a heated column to melt the glass into spherical droplets, which are subsequently cooled. Not all the particles are perfect spheres. Some are oblate, some are melted together and some contain small bubbles.

In one embodiment, the microspheres are plastic particles. The plastic particles selected should comprise a hardness greater than the substrate surface to protect the underlying substrate surface. One exemplary plastic particle includes polyurethane, polystyrene, acrylic and methacrylic acid ester polymers and copolymers (e.g., poly(methyl methacrylate)), and polyurea spheres.

In one embodiment, the microspheres comprise a surface modification as is known in the art to improve the adhesion of the microspheres to the bead bonding layer. Such treatments include those selected from the group consisting of silane coupling agent, titanate, organo-chromium complex, and the like, to maximize the adhesion of the microspheres to the first polymer layer. Preferably, the coupling agent comprises a nucleophilic group which is present on the surface of the microsphere and can react with the isocyanates in the reaction mixture of the bead bonding layer. Exemplary coupling agents may include an amino group such as an aminosilane. Having a nucleophilic group present on the surface of the microsphere will enable the isocyanates from the bead bonding reaction mixture to form covalent bonds, thereby improving the adhesion between the bead bonding layer and the plurality of microspheres.

In one embodiment, the treatment level for such coupling agents is on the order of 50 to 700 parts by weight coupling agent per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the coupling agent with the microsphere, followed by drying in a tumbler or auger-fed dryer to prevent the microspheres from sticking together. One skilled in the art would be able to determine how to best treat the microspheres with the coupling agent.

In one embodiment, the microspheres of the present disclosure have a Knoop hardness of at least 1,300 kg/mm$^2$, or even 1,800 kg/mm². The "Knoop hardness" as used herein is an indentation of microhardness measured by using a Knoop indenter; it is a value obtained by dividing the applied load with which a rhombic indentation is formed on the surface of a sample, by the projected area of the indentation computed from the long diagonal of the permanent indentation. The method for measuring the Knoop hardness is described in ASTM $C_{849}$-88 (2011) "Standard Test Method for Knoop Indentation Hardness of Ceramic Whitewares".

The microspheres for use in the present disclosure are substantially spherical, for example, having a sphericity of at least 80%, 85%, or even 90%, where sphericity is defined as the surface area of a sphere (with the same volume as the given particle) divided by the surface area of the particle, reported as a percentage.

Preferable examples of the spherical particles include fused alumina, alumina produced by the Bayer process, zirconia, and eutectic mixtures thereof.

As a method for shaping inorganic particles into spherical ones, it is possible to apply a method in which the above-described inorganic material in an indeterminate form is ground, and melted in a high-temperature oven at a temperature above the melting point thereof, thereby obtaining spherical particles by utilizing the surface tension; or a method in which the above-described inorganic material is melted at a high temperature above the melting point thereof, and the melt is sprayed to obtain spherical particles.

The microspheres useful in the present disclosure may be transparent, translucent, or opaque depending on the desired properties of the resulting article.

In another embodiment, the microspheres have a refractive index of less than 1.30, 1.40, 1.49, 1.50, 1.55, 1.60, 1.70, 1.80, or even 1.90. The refractive index may be determined by the standard Becke line method.

The microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers. In one embodiment, the microspheres are not glass bubbles, which are a hollow core encased in a glass sphere.

In some embodiments, a useful range of average microsphere diameters is at least 10, 20, 25, 40, 50, 75, 100, or even 150 μm (micrometers); at most 200, 400, 500, 600, 800, 900, or even 1000 μm. The microspheres may have a unimodal or multi-modal (e.g., a bimodal) size distribution depending on the application.

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening.

Alternately, average diameter can be determined using any commonly known microscopic methods for sizing particles. For example, optical microscopy or scanning electron microscopy, and the like, can be used in combination with any image analysis software. For example, software commercially available as free ware under the trade designation "IMAGE J" from NIH, Bethesda, Maryland.

In one embodiment, the plurality of microspheres has a difference in size distribution not more than 40% (30% or even 20%) based on the average microsphere diameter.

Adhesive Layer

In some embodiment, the multilayered article of the present disclosure, includes an adhesive layer which extends across and directly contacts the major surface of the elastomeric layer facing away from the primer layer.

In one embodiment, the adhesive layer is a pressure sensitive adhesive and is normally tacky at ambient conditions. Suitable pressure sensitive adhesives can be based on polyacrylates, polymethacrylates, synthetic and natural rubbers, polybutadiene and copolymers or polyisoprenes and copolymers. Silicone based adhesives such as polydimethylsiloxane and polymethylphenylsiloxane may also be used.

Particularly preferred pressure sensitive adhesives include poly(meth)acrylate-based adhesives, which can display advantageous properties as high degrees of clarity, UV-stability and aging resistance. Poly(meth)acrylate adhesives that can be used in surfacing film applications are described, for example, in U.S. Pat. No. 4,418,120 (Kealy et al.); RE Pat. No. 24,906 (Ulrich); U.S. Pat. No. 4,619,867 (Charbonneau et al.); U.S. Pat. No. 4,835,217 (Haskett et al.); and International Publication No. WO 87/00189 (Bonk et al.).

Preferably, the poly(meth)acrylate pressure sensitive adhesive comprises a crosslinkable copolymer of a $C_4$-$C_{12}$ alkyl acrylate and an (meth)acrylic acid. The adhesive can be used with or without a crosslinker. Useful crosslinking reactions include chemical crosslinking and ionic crosslinking. The chemical crosslinker could include polyaziridine and/or bisamide and the ionic crosslinker may include metal ions of aluminum, zinc, zirconium, or a mixture thereof. A mixture of chemical crosslinker and ionic crosslinker can also be used. In some embodiments, the poly(meth)acrylate pressure sensitive adhesive includes a tackifier such as rosin ester. Adhesives useful in the present disclosure may also contain additives such as ground glass, titanium dioxide, silica, glass beads, waxes, tackifiers, low molecular weight thermoplastics, oligomeric species, plasticizers, pigments, metallic flakes and metallic powders as long as they are provided in an amount that does not unduly degrade the quality of the adhesive bond to the surface.

As an alternative to pressure sensitive adhesives, the adhesive layer may be a hot melt adhesive, which is not tacky at room temperature but becomes tacky upon heating. Such adhesives include acrylics, ethylene vinyl acetate, and polyurethane materials.

Generally, the adhesive layer can have a thickness of at least 15, 20, 25, 30, or even 40 micrometers; and at most 50, 60, 75, or even 90 micrometers.

For certain applications, it may be desirable for the adhesive to be repositionable, at least initially, so that the sheet can be adjusted to fit at a desired place before a permanent bond is formed. Such repositionability may be achieved by providing, for example, a layer of minute glass bubbles on the adhesive surface as disclosed in U.S. Pat. No. 3,331,729 (Danielson et al.).

Optional Liner

If a pressure sensitive adhesive is used, a liner may be disposed onto the pressure sensitive adhesive opposite the elastomeric layer. A liner is a temporary support that is not intended for final use of the adhesive article and is used during the manufacture or storage to support and/or protect the adhesive layer. A liner is removed from the adhesive layer prior to use. Such liners are known in the art.

Typically, a liner includes a support such as a polymeric film (such as a polyolefin or polyester) or a paper (such as crepe or Kraft paper), which is coated with a release agent. Such release agents are known in the art and are described, for example in "Handbook of Pressure Sensitive Adhesive Technology," D. Satas, editor, Van Nostrand Reinhold, New York, N.Y., 1989, pp. 585-600. Examples of release agents include carbamates, silicones and fluorocarbons. In one embodiment, the liner comprising a silicone coated polyester or a silicone coated paper.

In one embodiment, the 180 degree peel force to separate the adhesive layer (e.g., a (meth)acrylic pressure sensitive adhesive) from the liner is at least 0.1, 0.2, 0.3, 0.4, 0.5, or even 0.6 N/mm and at most 0.7, 0.8, 0.9, or even 1.0 N/mm at a rate of 12 in/min (30 cm/min).

Method of Making

Figure 2A:
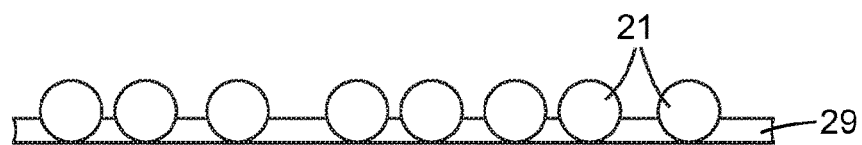
FIG. 2A-2E depicts a method of making an article according to one embodiment of the present disclosure.

In one embodiment, the articles disclosed herein may be made via a transfer process wherein the monolayer of microspheres is held in a transfer polymer which is then used to transfer the monolayer of microspheres onto the bead bonding layer. Such a transfer process is shown in FIGS. 2A-2E. FIG. 2A depicts a transfer carrier comprising a monolayer of microspheres 21 partially embedded in transfer polymer 29. Typically, the transfer polymer is supported on a transfer support (not shown) to provide handling ability to the transfer carrier. Such transfer supports include for example, a polyester layer. Such a transfer carrier is described for example, in paragraphs [0021]-[0029] of US Pat. Publ. No. 2015/0010723 (Krishnan et al.); and paragraphs [00130]-[0139] of WO 2017/172888 A1 (Walker et al.). In one embodiment, a transfer polymer is disposed onto a transfer support layer and coated with microspheres as discussed in the Example Section below. In another embodiment, a polymer disposed on a support can be commercially obtained (such as from Felix Schoeller Group, Pulaski, N.Y.) and the microspheres are then coated onto the commercial product.

In one embodiment, the plurality of microspheres is randomly-distributed and closely packed (i.e., generally there is not enough space between neighboring microspheres to place another microsphere) on the transfer carrier.

In one embodiment, the plurality of microspheres is patterned on the surface of the transfer carrier and thus, patterned on the resulting finished article. WO Publ. No. 2017/106239 (Clark et al.), incorporated herein by reference, discloses a monolayer of microspheres arranged in a microscopic periodic pattern, meaning that the microspheres are arranged in a pattern on the microscopic level (i.e., a pattern in relation to the other microspheres) and the pattern is periodic (i.e., not random and having an order to it). The unit repeat, i.e., the area consuming the repeat pattern may have a triangular, quadrilateral (e.g., squares, rhombus, rectangle, parallelogram), hexagonal, or other repeat pattern shape, which may be symmetric or asymmetric in nature. Appl. No. PCT/US2017/024711 (Walker et al.) incorporated herein by reference, discloses a monolayer of randomly distributed microspheres arranged in a predetermined pattern atop a surface. The predetermined pattern comprises at least one of (i) a plurality of the first areas, (ii) a plurality of the second areas, and (iii) combinations thereof. In one embodiment, the plurality of microspheres within the second area are closely packed. Exemplary shapes of the first and second areas include lines (or stripes), triangular, hexagonal, rectangular, or oblong shapes. The patterns may be pseudo-random, meaning that pattern may appear random, but it is not. Pseudo-random patterns are typically less noticeable to the naked eye than a regular pattern.

Figure 2B:
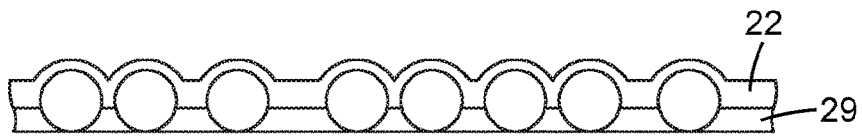

As shown in FIG. 2B, bead bonding layer 22 is applied to the transfer carrier, such that the plurality of microspheres is positioned between bead bonding layer 22 and transfer polymer 29. The bead bonding layer is made from a liquid reaction mixture and thus, can be coated using any known technique. Suitable techniques include, for example, coating or extruding.

In an exemplary extrusion process, the reaction mixture components of the bead bonding layer are initially mixed into two separate parts to prevent premature reaction. One part can be prepared by first mixing the polyol components with the hydroxy-functional silicone poly(meth)acrylate, a suitable solvent, and any optional additives. The other part contains the isocyanate component along with any solvent or optional additives. The first and second parts are then mixed in appropriate amounts to obtain a desired NCO:OH ratio. In these embodiments, the NCO:OH ratio can be selected to be between 0.75 and 1.25.

Once mixed, the bead bonding reaction mixture can be coated onto the transfer carrier comprising the microspheres. The coating can be made using conventional equipment such as a knife coater, roll coater, reverse roll coater, notched bar coater, curtain coater, rotogravure coater, or rotary printer. Coatings can be hand spread or automated and may be carried out according to either a batch or continuous process. The viscosity of the bead bonding reaction mixture can be adjusted as needed to suit the type of coater used.

After coating, the bead bonding layer may be subjected to heat and/or vacuum to remove organic solvents and any other volatile components and thermally activate the curing reaction between the polyol and isocyanate and partially cure the bead bonding layer. In one embodiment, the reaction mixture used to form the bead bonding layer is substantially free (i.e., less than 1, 0.5, 0.1, or even 0.05% by wt or even none) of a photoactive curing agent. In some embodiments, the bead bonding layer is 30% to 90% cured.

The partial curing of the bead bonding layer was found to improve adhesion of the primer layer to the bead bonding layer, particularly when the primer layer is disposed onto the partially-cured bead bonding layer and both layers are cured together. By contrast, fully curing the bead bonding layer was observed to reduce adhesion between the bead bonding layer and the primer layer.

An oven can be used to first evaporate the solvent and partially cure the bead bonding layer. Commonly, the drying/curing step takes place in air. Where a continuous process is used, these processes can act upon a moving web. In an exemplary continuous process, a 0.0076 centimeter (0.003 inch) thick wet coating could have a solids content of about 45%, and be dried and cured using a temperature profile with a residence time of 2 minutes at 80° C. followed by a residence time of 10 minutes at 125° C.

In general, the bead bonding layer is preferably dried and/or cured at pre-determined temperatures of from at least 25, 20, 35, 40, 50, or even 60° C. to at most 80, 90, 100, 110, 120, 130, 140, or even 150° C. Residence time at a given temperature, while highly dependent on the temperature, can be from at least 5, 10, 20, 30, 45, or even 60 seconds seconds to at most 120, 150, or even 180 seconds. The bead bonding layer is preferably subjected to residence times and temperatures, or temperature ranges, that balance solvent removal and curing effectiveness with overall throughput and energy efficiency.

As shown in FIG. 1, bead bonding layer 22 conforms to the plurality of microspheres, such that its second major surface 13 (the surface opposite the monolayer of microspheres) is undulated. Depending on the bead bonding reaction mixture and the cure conditions, the cured bead bonding layer may not have a homogeneous thickness across the layer. For simplicity, the effective thickness of the bead bonding layer is referred to. An effective thickness of the bead bonding layer is the average theoretical thickness of the bead bonding layer assuming a linear profile. In one embodiment, the effective thickness of the bead bonding layer is at least 12, 15, 20, 25, 30, 35, or even 40 micrometers; and at most 50, 60, 75, or even 85 micrometers. In one embodiment, the bead bonding layer should be thick enough to strongly attach the microspheres, but not so thick that it may crack upon bending (such as rolling up the finished article or bending the finished article around a curved object).

Figure 2C:
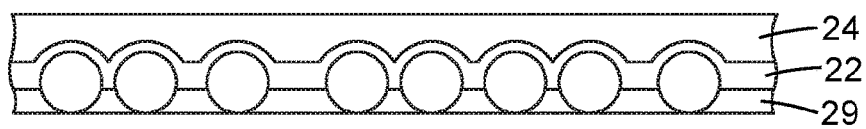

As shown in FIG. 2C, primer layer 24 is applied directly onto bead bonding layer 22. Any known method can be used to dispose the primer layer onto the underlying bead bonding layer, including any of those mentioned above for coating the bead bonding layer.

Typically, heat is applied to evaporate the water and/or any other volatiles species, and then cure the primer layer and the bead bonding layer. Oven temperature profiles can be similar to those disclosed above for partially curing the bead bonding layer. Since the degree of cure need not be limited for this second curing cycle, however, it can be advantageous to use a higher temperature or increase the duration of the curing step if temperature is not significantly increased.

In some embodiments, the bead bonding layer and the primer layer are allowed to continue to cure having been cooled following the heating step and prior to any further coating or lamination steps. This can be accomplished by aging the multilayered article comprising these layers at ambient conditions. Aging can take place for at least 1 week, at least 2 weeks, at least 3 weeks or at least 4 weeks to allow the bead bonding layer and the primer layer to reach a generally stable and consistent degree of crosslinking.

Figure 2D:
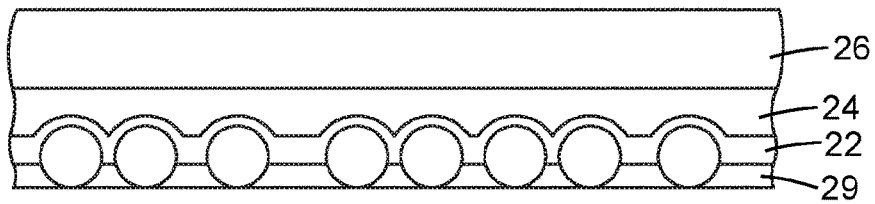

The primer layer comprises excess unreacted amines (for example at least 3, 4, or even 5% and at most 6, 7, 8, 9, or even 10% by weight of amines), enabling the primer layer to covalently bond to bead bonding layer 22 and the subsequently added elastomeric layer 26, which is shown in FIG. 2D.

Elastomeric layer 26 is disposed onto the exposed major surface of primer layer 24. In one embodiment, both the bead bonding layer and primer layer have been fully cured. In some embodiments, the elastomeric layer can be melt processed and coated onto the primer layer from the melt. In alternative embodiments, the elastomeric layer can be melt processed and formed into a uniform sheet separately, then subsequently hot laminated to the exposed primer layer.

In one embodiment, elastomeric layer 26 can be formed by extruding (for example using a twin-screw extruder or a planetary extruder) a reactive polyurethane mixture through a die directly onto primer layer 24. The components of the reactive mixture (e.g., the diisocyanate, diol chain extender, and polyester polyol) can be individually or simultaneously fed into the extruder. An example of a suitable die includes a coat hanger die. The uniform film can be further pressed by a cold roller which thermally quenches the reaction shaping the polyurethane, thereby solidifying the polyurethane thermoplastic elastomer. The extrusion can occur at any suitable temperature. For example, the temperature can be in a range of from 40, 50, 60, 70, 80, 90, or even 100° C. to at most 175, 200, 210, 220, or even 230° C. The extrusion can occur for any suitable amount of time. For example, the extrusion process (e.g., in making a continuous web) can occur for a period of time ranging from at least 0.5, 1, 2, 4, or even 6 hours to at most 10, 12, 15, or even 17 hours.

Additional layers can be attached to the multilayered article including an adhesive layer and a liner, which are not shown in FIG. 2D. For example, an adhesive layer can be directly coated onto the remaining layers of the article or formed into an adhesive film and then laminated to the bulk layer in a subsequent step. In the latter case, a sacrificial release liner is typically placed in contact with the adhesive layer to facilitate web handling and storage. To apply pressure-sensitive adhesive layer to the elastomeric layer it can be desirable to corona treat (e.g., air or $N_2$ corona treatment) and thermally laminate a major surface of the extruded elastomeric layer to be bonded to, for example, a pressure-sensitive adhesive layer. To accomplish this, the major surface of elastomeric layer, which is not in contact with the primer layer, is exposed and then corona treated. If a hot laminating process is used (e.g., elastomeric layer is extruded onto a releasable carrier web or liner), the carrier web or liner can be first stripped off of the elastomeric layer.

The primer layer and elastomeric layer can be bonded together, for example by laminating the layers at an elevated temperature and pressure. For example, one major surface of the primer layer can be cold laminated under pressure to one major surface of the extruded elastomeric layer while at least the one major surface of the elastomeric layer is, or both elastomeric layer and the primer layer are, at an elevated temperature that is sufficiently high enough to facilitate adequate bonding between primer layer and elastomeric layer. As used herein, cold laminating refers to the layers being laminated together between two nip surfaces in about a room or ambient temperature environment (e.g., the layers are not kept in an intentionally heated environment during the laminating process). The nip surfaces can be two nip rollers, a stationary nip surface (e.g., a low friction surface of a flat or curved plate) and a nip roller, or two stationary nip surfaces. The laminating process can even be performed in a below ambient temperature environment (that is, the layers are intentionally cooled during the laminating process). For example, one or both of the nip surfaces can be chilled to a temperature below ambient, in order to cool the exposed major surfaces of the polyurethane layers (that is, the major surfaces the nip surfaces contact). The use of such chilled surfaces can eliminate, or at least help reduce, warping of the layers resulting from the laminating process. At the same time, the major surfaces that make contact at the interface between the polyurethane layers remain at the elevated temperature long enough to be sufficiently bonded together by the laminating pressure exerted by the nip surfaces.

Such cold laminating can be accomplished by laminating the newly extruded elastomeric layer directly onto a preformed primer layer, while the elastomeric layer material still retains significant heat from the extrusion process. The multilayered article including the primer layer can be still releasably bonded to the carrier web or liner, to provide additional structural strength.

Alternatively, one major surface of primer layer can also be bonded to one major surface of the extruded polymeric layer by using a hot laminating process. With this process, the initial temperature of both the primer layer and the elastomeric layer is about room temperature or at least a temperature that is too low to facilitate adequate bonding between primer layer and the elastomeric layer. Then, at least the one major surface of the elastomeric layer, at least the one major surface of the primer layer, or the one major surfaces of both the primer layer and the elastomeric layer are heated to an elevated temperature that is sufficiently higher than room temperature to facilitate adequate bonding between the primer layer and the elastomeric layer under the laminating pressure. With the hot laminating process, the layers are heated before or during the application of the laminating pressure. If a hot laminating process is used, a major surface of the elastomeric layer can be releasably laminated to a readily releasable carrier web or liner (for example, a polyester carrier web) directly after the elastomeric layer is extruded, in order to provide the freshly polymeric layer with additional structural support.

Acceptable minimum temperatures and pressures for bonding the layers together, using either the cold or hot laminating process, have included a temperature of at least about 200° F. (93° C.) and a pressure of at least about 15 lb/in$^2$ (pounds/inch$^2$ or psi) (10.3 N/cm$^2$ (Newtons/centimeter$^2$)).

Figure 2E:
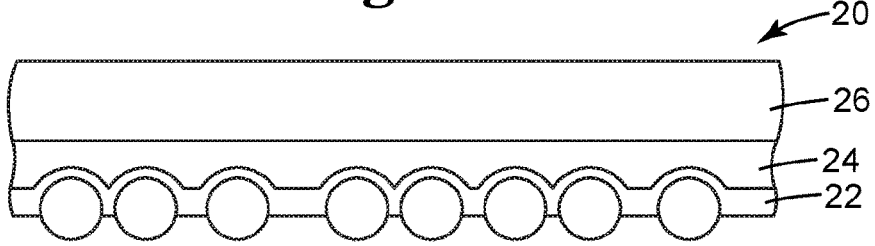

In one embodiment, the transfer polymer layer 29 is removed from bead bonding layer 22, resulting in the plurality of microspheres to be transferred to the bead bond layer and ultimately resulting in microsphere-coated polyurethane article 20 as shown in FIG. 2E. The transfer polymer layer (and the transfer carrier) is typically removed after the adhesive layer and liner have been assembled onto the multilayered article. Typically, at least one rigid layer needs to be part of the multilayered article to enable handling of the article during further processing. Typically, this rigid layer is either a release liner attached to an adhesive layer of the article or is part of the transfer carrier. The transfer carrier (comprising the transfer polymer and corresponding transfer support layer) may be removed during manufacture or by the end-user just prior to application of the multilayered article onto a surface to be protected.

Additional Layers

In addition to the elastomeric layer, primer layer, bead bonding layer, and microsphere layer and optional adhesive and release liners previously mentioned, the resulting article of the present disclosure may also comprise additional layers to impart desirable characteristics into the article.

In one embodiment, a nanoparticle-containing undercoat may be applied between the microsphere layer and the bead bonding layer to provide anti-soiling properties as taught in U.S. Pat. Publ. No. 2015-0343502 (Clark et al.), incorporated herein by reference.

In one embodiment, the multilayered article can comprise pigment(s) such that it also has a graphic function. Typically, if a graphic image is desired it is provided separately on the surface of the bead bonding layer opposite the microsphere layer by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

In one embodiment, the multilayered article comprising a thin coating of metal (e.g., silver or aluminum) on the underside of the microspheres to act as a mirror for retroreflection.

Article

The multilayered articles of the present disclosure comprise a plurality of microspheres, which are arranged in a monolayer (i.e., a single layer) on the surface of the bead bonding layer. The plurality of microspheres are partially embedded into the bead bonding layer, which means that the microspheres are (on average) embedded approximately at least 50, 55, 60, 65, or even 70% and no more than 80% of the average microsphere diameter into the bead bonding layer, however, a portion (for example, at least 10, 20, or even 25%) of each of the microspheres projects outwardly from the surface of the bead bonding layer.

Depending on the arrangement (random versus patterned) of the plurality of microspheres on the surface on the bead bonding layer, the plurality of microspheres cover more than 10, 15, 20, 25, or even 30%; and less than 35, 40, 45, 50, 55, 60, 65, 70 or even 75% of the surface of the bead bonding layer. In one embodiment, the plurality of microspheres are randomly-distributed and closely packed (i.e., generally there is not enough space between neighboring microspheres to place another microsphere) and the plurality of microspheres covers at least 65% and at most 80% of the first surface. Generally, it is preferably that there is less than one average microsphere diameter between adjacent microspheres to achieve adequate abrasion resistance and minimize visual defects.

In one embodiment, the surface of the finished article can be abraded to truncate the exposed top surfaces of the plurality of microspheres in the microsphere monolayer. Such a technique is described in WO 2019/046407 (Clark et al.), herein incorporated by reference.

In one embodiment, the multilayered article can be shaped.

Applications and Properties

The provided multilayered articles may be useful in paint protection and paint replacement applications. These films can be applied to any of a wide variety of substrates. Such substrates may be flat or curved. When it is desired to adhere these articles to such curved surfaces, it is preferable that the article has sufficient flexibility to conform to the surface of the substrate without delaminating at the edges or wrinkling.

In one embodiment, the provided article is applied to a motor vehicle, an aircraft, or a watercraft. In some embodiments, the provided article is applied for protection to the exterior surfaces of automobiles (such as bumper facia, pillar posts, rocker panels, wheel covers, headlights, door panels, trunk and hood lids, mirror housings, dashboards, floor mats, and door sills), trucks, motorcycles, trains, airplanes (such as propeller blade, wing, or fuselage), rotorcraft, marine vessels (such a hull, transom, or bulwark), and snowmobiles. In alternative embodiments, the articles of the present disclosure can be applied to surfaces of structures other than vehicles, such as fixtures, buildings and architectural surfaces. Applications of these films may be either indoor or outdoor in nature.

In an exemplary method of application, the multilayered article disclosed herein can be mounted to a suitable substrate by simultaneously peeling away the release liner from the adhesive layer while applying the film onto the substrate in a single continuous motion.

Advantageously, the bead bonding layer provides a combination of desirable optical and mechanical properties rendering it especially suitable as an outermost layer in protective film applications.

In one embodiment, the article of the present disclosure is durable, meaning that it has abrasion and/or scratch resistance. Abrasion resistance, can be measured using a rotary Taber abraser and visually inspecting the samples for damage. In one embodiment, the decorative articles of the present disclosure have an abrasion resistance with little to no visual abrasion. The scratch resistance can be measured by pencil hardness. In other words, at which hardness the pencil scratches the surface. In one embodiment, the decorative articles of the present disclosure have a pencil hardness value of at least 6H, 8H, or even 10H at a force of 2.5 Newtons. In one embodiment, the articles of the present disclosure have a pencil hardness value of at least 3H, 5H, 6H, 8H, 9H, or even 10H at a force of 7.5 Newtons.

In one embodiment, the articles of the present disclosure do not show fingerprints.

The articles of the present disclosure may or may not be retroreflective. Typically to be retroreflective, a thin layer of metal is used in the construction behind the embedded portion of the microspheres to achieve retroreflection. Retroreflectivity of an article can be expressed in terms of its coefficient of retroreflectivity ($R_a$)

$$R_a = E_r * d^2 / E_s * A$$

where:
$E_r$=illumination incident upon the receiver
$E_s$=illumination incident upon a plane perpendicular to the incident ray of the specimen position, measured in the same units as $E_r$
d=distance from the specimen to the projector
A=area of the test surface The coefficient of retroreflectivity ($R_a$) is further described in U.S. Pat. No. 3,700,305 (Bingham). In one embodiment, the articles of the present disclosure have a coefficient of retroreflection of less than or equal to 10, 5, 1, 0.5, or even 0.3 candelas/lux/square meter measured at 0.2° observation angle and 5° entrance angle following ASTM E810-03 (2013) "Standard Test Method for Coefficient of Retroreflection of Retroreflective Sheeting Utilizing the Coplanar Geometry", meaning that they are not retroreflective.

In one embodiment, the multilayered article withstands weathering. For example, the article is impermeable to water (such as rain and moisture), stable under exposure to ultraviolet light and/or durable. For example, weather testing can include placing panels of the multilayered article in the outside environment angled for example at 45 degrees relative to the ground in Arizona and 5 degrees relative to the ground in Florida. The multilayered articles with the monolayer of microspheres facing outward, are exposed to the elements (e.g., rain, sun, wind, etc.) for 1 to 4 years.

In one embodiment, the multilayered article is stable to ultraviolet radiation and/or heat. In one embodiment, the multilayered article of the present disclosure heat stable. Heat stability may be determined by adhesively attaching the multilayered article to a white painted panel and heating the sample in an oven at 80° C. for 7 days. The change in color is monitored using CIELAB color space, where L* defines the lightness, a* defines red/green, and b* defines blue/yellow. In optical applications, the b* parameter is selected since it is a measure of the blue-yellow as defined in the CIE (International Commission on Illumination 1976 Color Space, with the lower the b* value the more desirable. In one embodiment, the articles of the present disclosure after heat aging have a change in b* of less than 2, 1, or even 0.5.

In one embodiment, the multilayered article of the present disclosure is ultraviolet (UV) resistant. UV resistance may be determined in a similar manner as described above for heat stability, except that the sample is exposed to UV radiation for a given time period. In one embodiment, the articles of the present disclosure upon exposure to UV radiation have a change in b* of less than 2, 1, or even 0.5.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods.

TABLE 1

Materials

| Chemicals | Description |
| --- | --- |
| Propylene glycol methyl ether acetate | available from Eastman Chemicals, Kingsport, TN |
| Methyl isobutyl ketone | available from Eastman Chemicals, Kingsport, TN |
| Butyl acetate | available from Eastman Chemicals, Kingsport, TN |
| Cellulose acetate butyrate (CAB381.01) | Flow, agent, available from Eastman Chemicals, Kingsport, TN |
| TINUVIN-405 | UV light absorber available from BASF Corp., Florham Park, NJ |
| TINUVIN-292 | Hindered amine available from BASF |
| TINUVIN-123 | Hindered amine available from BASF |
| JONCRYL-587AC | Acrylic polyol available from BASF |
| CAPA-2054 | Caprolactone polyol available from Ingevity, North Charleston, NC |
| Dibutyl tin dilaurate | Catalyst available from Dow Chemicals, Philadelphia, PA |
| DESMODUR N3390 | Polyisocyanate available from Covestro, Leverkusen, Germany |
| 2,4-Pentanedione | available from GFS Chemicals, Columbus, OH |
| ALBERDINGK U933 | Polyurethane dispersion available from Alberdingk Boely, Greensboro, NC |
| NEOCRYL CX-100 | Polyaziridine available from DSM Coating Resins, LLC, Wilmington, MA |
| UVINUL N3039 | UV light absorber available from BASF, Florham Park, NJ |
| AMP-95 | Amine neutralizer available from ANGUS Chemical Company, Buffalo Grove, IL |
| TRITON GR-7M | Surfactant available from DOW Chemicals, Midland, MI |
| A1100 | Gamma-aminopropyltrimethoxysilane, a clear liquid coupling agent, available under the trade designation SILQUEST A1100 from Momentive Performance Materials Incorporated, Columbus, OH. |
| Borosilicate glass powder | Milled borosilicate glass powder having a size distribution of less than 200 mesh and density of 2.23 grams/cubic centimeter, available under the trade designation "PYREX 7740" from Strategic Materials Incorporated, Houston TX. |
| Butyl carbitol | Available from Dow Chemical Co., Midland, MI |
| 1,4 butanediol | Available from BASF |
| DESMODUR W | Bis(4-isocyantocyclohexyl) methane available from Bayer, Leverkusen, Germany |
| TINUVIN-571 | UV light stabilizer available from BASF |
| IRGANOX-1076 | Antioxidant, Octadecyl-3-(3,5-di-tert. Butyl-4-hydroxyphenyl)-propionate available from BASF |
| T12 | Dibutyl tin dilaurate catalyst available from Air Products, Detroit, MI |
| FOMREZ-44-111 | Polyester polyol available from Chemtura, Philadelphia, PA |

Transfer Carrier

The transfer carrier comprising a monolayer of microspheres can be obtained as follows: Borosilicate glass powder was flame treated by passing it through a hydrogen/oxygen flame at a rate of 3 grams/minute two times, then collected in a stainless steel container whereupon metallic impurities were removed using a magnet. The resulting glass microsphere beads were treated with 600 ppm of A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and which were free flowing. The resulting transparent silane treated microspheres were cascade coated using a mechanical sifter onto a transfer carrier comprising a polyethylene coated polyester (PET) film liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Test Methods

Heat Aging

The example was adhesively attached using the acrylic pressure sensitive adhesive layer to the front of a clear coat white coat painted panel (available from ACT Painted Panels LLC, Hillsdale, MI). A Hunterlab UltraScan Pro Spectrophotometer (Hunter Associates Laboratory Inc., Reston, VA) was placed in from of the monolayer of microspheres in the construction and used to determine the CIELAB color space. The sample (still adhered to the painted panel) was placed in an oven held at 80° C. for 7 days. The sample was removed from the oven and cooled and the CIELAB color space was determined.

Tabor Abrasion Test

The abrasion test was conducted according to the standard procedure described in ASTM 1044-13. The 5130 Abraser obtained from Taber Industry, North Tonawanda, NY was used to conduct the test. A harsh abrading wheel CS17 (from the same company) along with a 500 gram weight load was used. The test was run 200 cycles. After the test, haze was visually inspected.

Gravel Resistance

The gravel resistance test was conducted according to the standard procedure described in SAE (Society of Automotive Society) J400 at −20° C. A Gravel-O-Meter machine from The Q-Lab Corporation, Westlake, OH was used. The bead film was applied on an ACT clear coat white color coat painted panel and conditioned at −20° C. for 24 hours. The panel was then given the gravel test with one pint of gravel at 70 psi. After the gravel test, the panels were visually inspected.

Profilometry

The profilometry images were generated on a DektakXT profilometer, available from Bruker Nano Surfaces Division of Bruker Corporation located in Tucson, AZ The images were generated using the instrument's MapScan function over a 1 mm by 1 mm surface area with a 524 micron Z axis range using a 2 micrometer radius stylus tip and a 3 milligram stylus force. Scan resolution was 0.3 microns per data point during the scan and 250 scans stitched together with 4 microns between scans to create the image.

Comparative Example A

The bead bonding composition was prepared by mixing 11 grams of propylene glycol methyl ether acetate, 18 grams of butyl acetate, 19 grams of methyl isobutyl ketone, 2.2 grams of cellulose acetate butyrate-381.01, 0.7 grams of TINUVIN-405, 0.35 grams of TINUVIN-292, 6.8 grams of CAPA-2054, 27.2 grams of JONCRYL-587AC, and 14.75 grams of xylene. The mixture was mixed for 30 minutes. After 30 minutes, 0.579 grams of 2,4-pentanedione, 0.021 grams of dibutyl tin dilaurate, and 11.72 grams of DESMODUR N3900 were added into the mixture and the clear and colorless solution was thoroughly agitated for 15 minutes.

The solution was then coated onto the monolayer of microspheres side of the Transfer Carrier at about 127 microns wet thickness using a notchbar coater. The bead bonding layer was dried and partially cured in an air oven for 5 minutes at 195° F. (90.6° C.) The bead bonding layer allowed to stand at ambient conditions for a week. The bead bonding layer had a glass transition temperature of 90° C. measured using a dynamic mechanical analyzer (such as DMA Q800) with a ramp rate of 10° C./minute at 1 Hertz.

The exposed surface of the bead bonding layer was primed by plasma treatment (Atto, Diener electronic GmbH+Co. KG, Ebhausen, Germany) set at maximum 200 watt power at 40 kiloHertz for 5 minutes using air as the treatment gas.

The primed bead coating construction was allowed to stand overnight and then a elastomeric layer was extruded on the plasma-treated bead bonding surface as follows: 504.7 grams of pre-melted FOMREZ-44-111 (having a melting temperature of 60° C.) at 100° C., 5 grams of IRGANOX-1076, 0.3 grams of T12, 88.6 grams of 1,4 butanediol, 401.9 grams of DESMODUR W, 3 grams of TINUVIN-292, and 4.5 grams of TINUVIN-571 were fed separately into a twin-screw extruder. The extruder setup, conditions, and temperature profiles were similar to that described in Example 1 and in Table 1 in U.S. Pat. No. 8,551,285 (Ho et al.). The isocyanate index was NCO/OH=1.03 and hard segment was at 48.25 wt %. The resulting aliphatic thermoplastic polyurethane was extruded as a 4 mil (100 micrometer) thick layer onto the plasma-treated bead bonding layer. The extruded elastomeric layer was thermally laminated with the bead bonding layer to achieve good interfacial adhesion. The elastomeric layer had an elongation of about 600% when measured by ASTM D-882-18 will a pull rate of 12 in/min (30 cm/min) with a jaw gap of 1 in (30 cm) using, for example, an Instron model 5565 (Norwood, MA).

Figure 3:
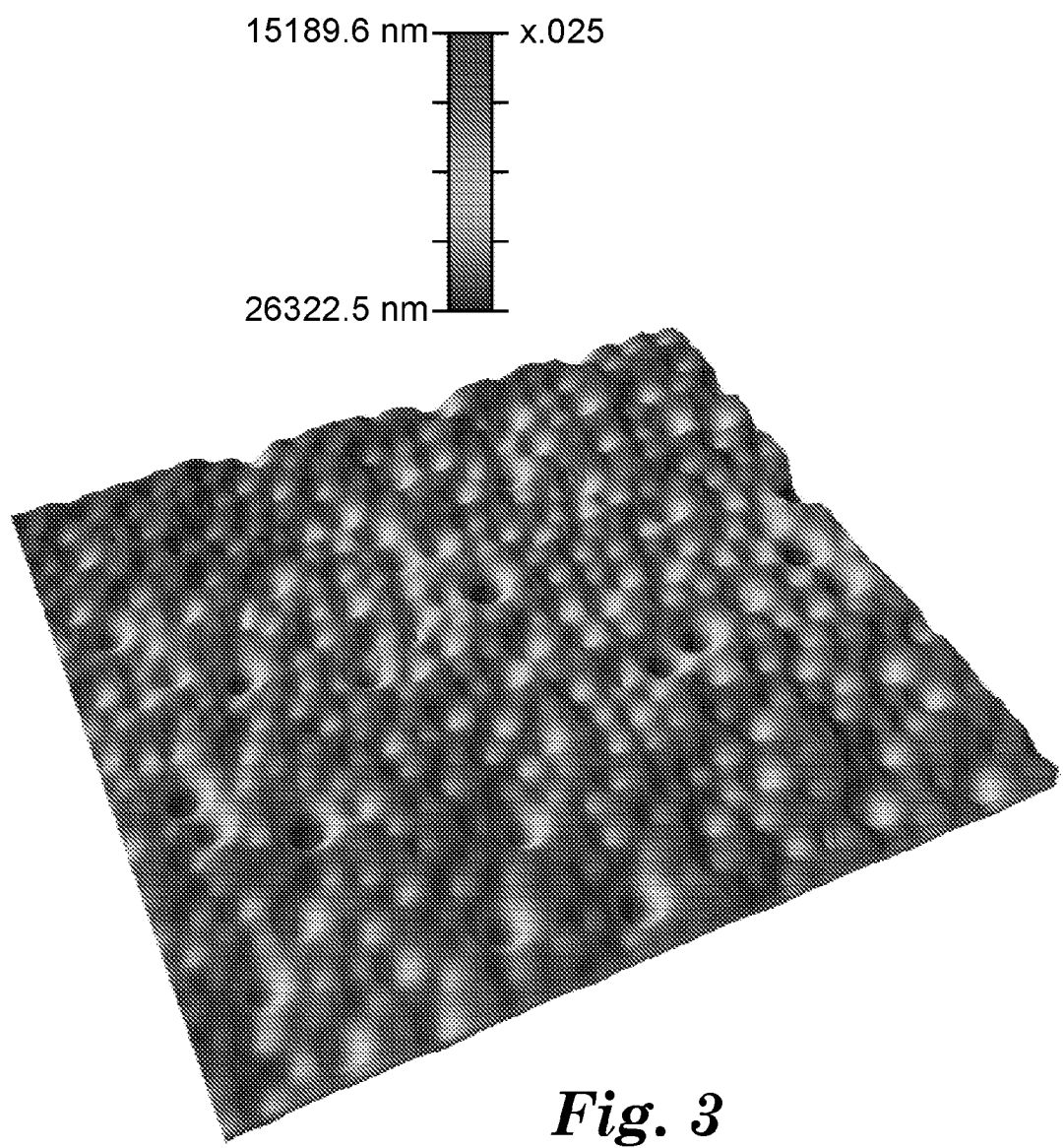
FIG. 3 is a profilometry image of a portion of Comparative Example A's surface.

An acrylic based pressure sensitive adhesive (isooctyl acrylate/acrylic acid copolymer) disposed onto a 2 mil silicone-coated polyethyleneterephthalate release liner was thermally laminated to the elastomeric layer at 190° F. (88° C.) under 35 psi (0.24 MPa) nip roll pressure. After a week, the polyethylene coated polyester film liner from the Transfer Carrier was removed. Visual inspection of the removed polyethylene coated polyester film liner showed microspheres did not transfer. FIG. 3 is a profilometry image taken of about a 1 mm×1 mm portion of the exposed surface of the sample after removal of the polyethylene coated polyester film liner.

Example 1

The bead bonding composition was applied to the Transfer Carrier and dried in the oven as described in Comparative Example A.

The primer layer was prepared as follows: into 89.30 grams of ALBERDINGK U933, was added 0.35 grams of TINUVIN-123, 0.05 grams AMP-95, 0.20 grams of TRITON GR-7M, 8.5 grams of butyl carbitol, 1.16 grams of UVINUL N3039, and 2 grams of NEOCRYL CX-100 and homogeneously mixed. The solution mixture was diluted with 10 grams of de-ionized water to keep its viscosity in between 100 centipoise and 200 centipoise.

The primer layer was coated onto the dried bead bonding layer at 100 micrometers wet thickness and was cured 10 minutes in a 195° F. (91° C.) air oven.

An elastomeric layer was made and extruded as described in Comparative Example A. The elastomeric layer was extruded onto the primer layer of the construction at 4 mil (0.1 mm) thickness and the elastomeric layer was thermally laminated with the primer layer to achieve good interfacial adhesion.

Figure 4:
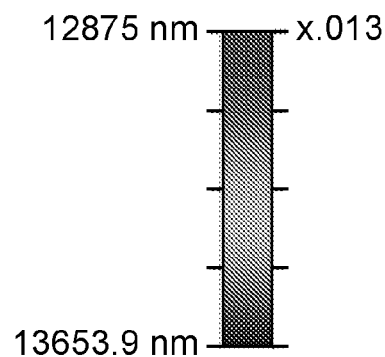
FIG. 4 is a profilometry image of a portion of Example 1's surface.
Figure 4:
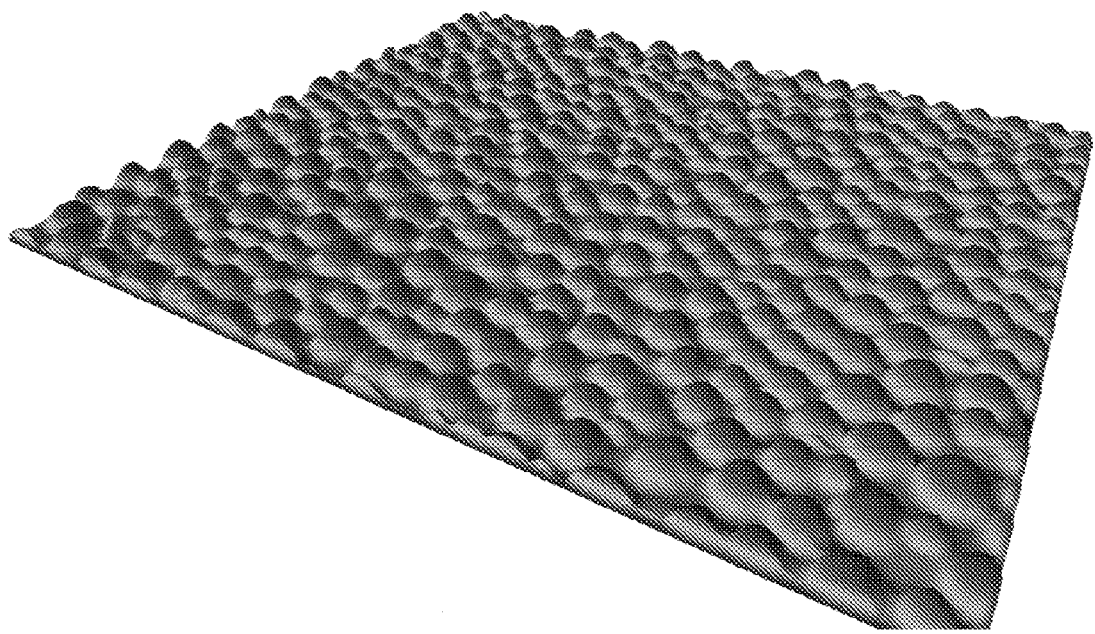

An acrylic based pressure sensitive adhesive (isooctyl acrylate/acrylic acid copolymer) disposed onto a 2 mil (0.05 mm) silicone-coated polyethyleneterephthalate release liner was thermally laminated to the elastomeric layer at 190° F. (88° C.) under 35 psi (0.24 MPa) nip roll pressure. After a week, the polyethylene coated polyester film liner from the Transfer Carrier was removed. Visual inspection of the removed polyethylene coated polyester film liner showed little to no microspheres thereon. FIG. 4 is a profilometry image taken of about a 1 mm×1 mm portion of the exposed surface of the sample after removal of the polyethylene coated polyester film liner. The monolayer of microspheres side of the construction was then tested for Tabor Abrasion Testing and Gravel Resistance and abraded construction showed no haze and no chipped paint. The example was also tested for heat aging and the results are as follows: delta L*=−0.15; delta a*=−0.05; delta b*=0.45; and delta E*=0.48.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. An article comprising:
   (a) a microsphere layer comprising a plurality of microspheres disposed in a monolayer;
   (b) a bead bonding layer comprising a first major surface and a second opposing major surface and the plurality of microspheres is partially embedded in the first major surface of the bead bonding layer, and comprises a thermoset polyurethane having a glass transition temperature of at least 35° C.;
   (c) a primer layer disposed on the second major surface of the bead bonding layer wherein the primer layer comprises a copolymer of polyurea and polyurethane and wherein the primer layer is covalently attached to the bead bonding layer via urea linkages; and
   (d) an elastomeric layer disposed on the primer layer opposite the bead bonding layer, wherein the elastomeric layer comprises a polyurethane thermoplastic elastomer.

2. The article of claim 1, wherein the elastomeric layer has an elongation at break of at least 200%.

3. The article of claim 1, wherein the elastomeric layer comprises a reaction product of a reaction mixture comprising:
   a diisocyanate;
   a polymeric diol; and
   a diol chain extender, optionally, wherein the diol chain extender has a weight-average molecular weight of less than about 250 daltons.

4. The article of claim 1, wherein a weight-average molecular weight of the polyurethane thermoplastic elastomer is in a range of from 80,000 daltons to 400,000 daltons.

5. The article of claim 3, wherein the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, toluene 2,4-diisocyanate, tolylene-2,6-diisocyanate, poly(hexamethylene diisocyanate), 1,4-cyclohexylene diisocyanate, 4-chloro-6-methyl-1,3-phenylene diisocyanate, toluylene diisocyanate, diphenylmethane 4,4'-diisocyanate, 1,4-diisocyanatobutane, 1,8-diisocyanatooctane, or a mixture thereof.

6. The article of claim 3, wherein the polymeric diol is selected from a polyester diol, a polycaprolactone diol, a polyether diol, a polycarbonate diol, a polyolefin diol or mixtures thereof.

7. The article of claim 3, wherein the diol chain extender is chosen from ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, or a mixture thereof.

8. The article of claim 1, wherein the polyurethane thermoplastic elastomer comprises a hard segment in a range of from about 30 wt % to about 55 wt %.

9. The article of claim 1, wherein the thermoset polyurethane is a reaction product of:
   a polyisocyanate; and
   a polyol selected from the group consisting of: a polycaprolactone polyol, a polycarbonate polyol, a polyester polyol, an acrylic polyol, a polyether polyol, a polyolefin polyol, and mixtures thereof.

10. The article of claim 9, wherein the polyisocyanate is a primary aliphatic polyisocyanate.

11. The article of claim 1, wherein the primer layer is a water-borne polyurethane.

12. The article of claim 1, wherein the primer layer is essentially free of hydroxy-functional silicone poly(meth)acrylate.

13. The article of claim 1, wherein the refractive index of the plurality of microspheres is less than 1.9.

14. The article of claim 1, wherein the surface of the plurality of microspheres comprises a nucleophilic group, optionally wherein the nucleophilic group is an amino group.

15. The article of claim 1, further comprising an adhesive layer disposed on the elastomeric layer opposite the primer layer, optionally wherein the adhesive is a (meth)acrylic pressure sensitive adhesive.

16. The article of claim 1, wherein the article is not retroreflective, having a coefficient of retroreflection of less than or equal to 10, candelas/lux/square meter measured at 0.2° observation angle and 5° entrance angle following ASTM E810-03(2013).

17. The article of claim 1, wherein a portion of a microsphere in the plurality of microspheres project outwards from a surface of the article.

18. The article of claim 1, wherein a bulk of the bead bonding layer comprises less than 1% by weight or even no urea bonds.

19. A method of using an article, the method comprising:
   applying the article according to claim 1 to a surface of a means for transport, wherein the means for transport is a motor vehicle, an aircraft, or watercraft.

* * * * *